Figure 1:
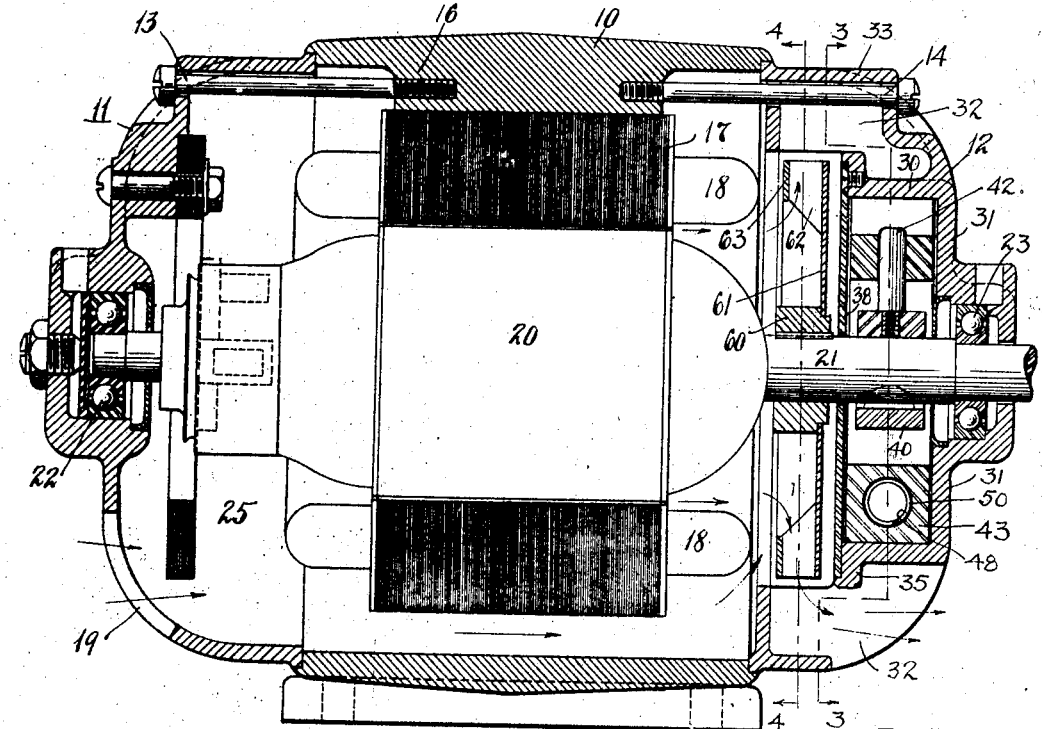

J. R. COOK.
SPEED CONTROLLING DEVICE FOR MOTORS.
APPLICATION FILED OCT. 28, 1918.

1,380,134.

Patented May 31, 1921.
2 SHEETS—SHEET 1.

Inventor:
Joel R. Cook,
By Baker Macklin
Attys.

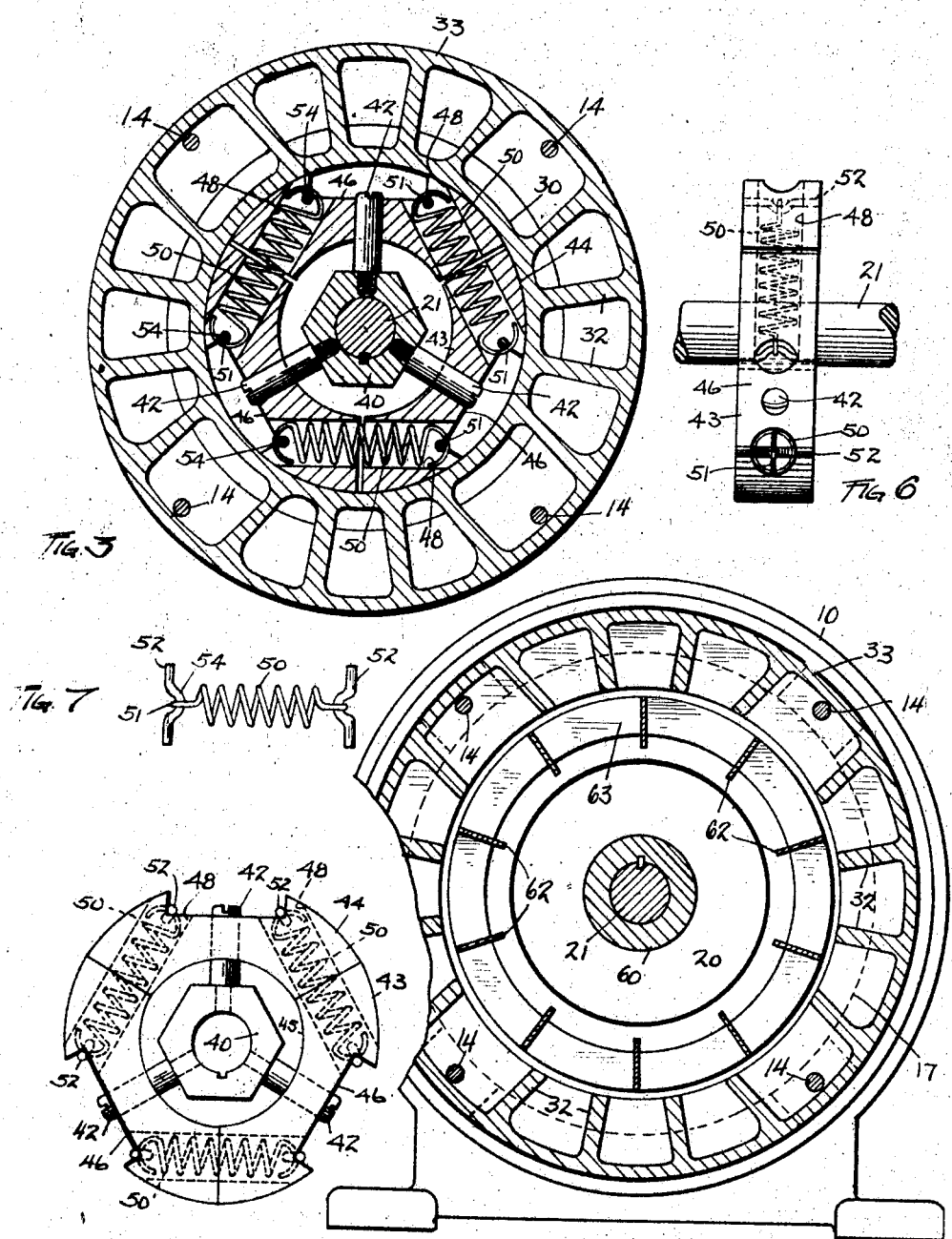

UNITED STATES PATENT OFFICE.

JOEL R. COOK, OF CLEVELAND, OHIO, ASSIGNOR TO THE DOMESTIC ELECTRIC COMPANY, OF CLEVELAND, OHIO, A CORPORATION OF OHIO.

SPEED-CONTROLLING DEVICE FOR MOTORS.

1,380,134.  Specification of Letters Patent.  Patented May 31, 1921.

Application filed October 28, 1918. Serial No. 259,932.

*To all whom it may concern:*

Be it known that I, JOEL R. COOK, a citizen of the United States, residing at Cleveland, in the county of Cuyahoga and State of Ohio, have invented a certain new and useful Improvement in Speed-Controlling Devices for Motors, of which the following is a full, clear, and exact description, reference being had to the accompanying drawings.

The object of this invention is to provide an electric motor with simple, efficient and compact means for insuring a substantially uniform speed of rotation, throughout the proper range of the motor, notwithstanding variations in the driven load. To this end I have provided a centrifugal governing brake, the parts of which are carried by the armature shaft and the motor casing, and which operates to furnish an artificial load when the outside load decreases. The brake comes into action whenever the speed materially increases above the normal and acts to transform the surplus energy into heat.

While my invention is applicable to various types of motors, it is particularly beneficial with series wound motors, as it enables them to have the constant speed usually attained by shunt winding. My invention is accordingly well adapted for embodiment with series wound universal motors. The high efficiency of series motors is obtained when the brake is not in action, while the dissipation of energy by the active brake may be slight, and is immaterial for many purposes.

To enable the heat generated by the braking friction to be rapidly radiated, the portion of the motor casing carrying the brake is made with separated webs and intervening openings, and a rotary fan is provided on the armature shaft for forcing air through these openings, thus maintaining the casing member cool. This same fan draws its air through the spaces about the armature and field windings and thus acts to cool the motor itself as well as the centrifugal governor.

The rotary member of the governing brake is very simple in construction, and at the same time sufficiently sensitive to speed changes, and is very durable in service.

The various features of the invention will be hereinafter more fully described in connection with the illustrative embodiment shown in the drawings, and the essential characteristics will be summarized in the claims.

Figure 2:
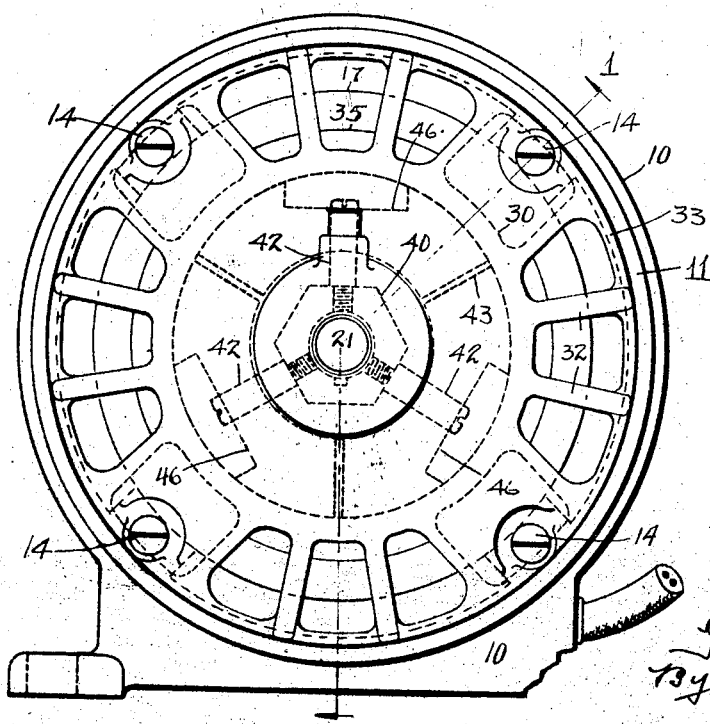

In the drawings Figure 1 is a longitudinal section of a motor equipped with my governing device, the section being for the most part vertical and diametric, but a portion of the section through the field frame being on angular planes as indicated by the line 1—1 on Fig. 2; Fig. 2 is an end view of the motor, looking from the right hand end of Fig. 1; Fig. 3 is a vertical transverse section through the centrifugal governor and radiator; Fig. 4 is a vertical transverse section through the fan as indicated by the line 4—4 on Fig. 1; Fig. 5 is an elevation of the rotary member of the centrifugal governor; Fig. 6 is an edge view of such governor; Fig. 7 is a view of one of the springs of the governor and the two bars to which its ends are anchored.

As shown in Fig. 1, 10 indicates a central ring-like frame member, and 11 and 12 the respective end members of the frame, these end members being secured to the member 10 by bolts 13 and 14. In the interior of the central ring member 10 are suitable bosses 16 which are shown as carrying a laminated field ring 17. 18 indicates the winding for this member.

The armature designated 20 is mounted on a shaft 21 journaled in bearings 22 and 23 carried by the end members 11 and 12 respectively. 25 indicates a member for supporting the brushes, this member being carried by the end member 11 of the frame.

It is to be understood that the parts described in the preceding two paragraphs are simply illustrative and may be of any suitable construction. The motor shown is intended to be universal; *i. e.*, suitable for either alternating or direct current. I am therefore using the terms "field" and "armature" herein in their generic sense.

The end member 12 is provided with an internal cylindrical flange 30 forming the stationary member of the centrifugal governor. This flange is connected at its outer edge with the disk like end 31 of the member 12 and by webs 32 with the substantially cylindrical portion 33 of the end member. These webs together with the spaces between them form an effective radiator for the heat generated at the cylindrical portion 30. The whole end member may conveniently be one integral casting.

The inner edge of the cylindrical flange 30 is provided with an outward annular flange 35 and against this flange and the edge of the cylindrical portion 30 is secured a disk 38 which loosely surrounds the armature shaft. Accordingly a cylindrical chamber is provided about the armature shaft and between the plate 38 and the disk portion 31 of the end member. In this chamber is mounted the rotary member of the centrifugal governor, which will now be described.

Keyed to the armature shaft 21 is a collar or hub 40, shown as hexagonal. From this radiate equi-distant pins 42, three being shown. Suitably mounted on these pins are brake shoes 43 which have cylindrical faces 44 adapted to coact with the interior of the flange 30. Three of these brake shoes are shown, each of substantially 120° angular extent, and each centrally mounted on one of the pins 42. The shoes are conveniently concaved on their inner edges as shown at 45 concentrically of the surface 43. The surfaces 43 on each shoe are intermediately interrupted by a cutaway or notched portion of the shoe designated 46, this notch providing space into which the pin may extend.

Fig. 5 shows the three brake shoes assembled. Extending tangentially through adjacent shoes are alined openings 48. The openings of the adjacent shoes are occupied by tension springs 50, which tend to draw the shoes together. These springs are coiled wire members having hook-like end portions 51 which extend over bars 52 which lie against the surfaces of the brake shoes in the angle at the ends of the notches 46. These rods 52 are intermediately bent or offset into the openings 48 as shown at 54. These offset portions form convenient anchorages for the ends of the springs and also prevent the rods shifting longitudinally, so that they may maintain their proper position on the brake shoes.

The material of the brake shoes depends on the speed and size characteristics of the motor. For instance, when the speed is high the shoes are preferably light and may conveniently be made of fiber; when the speed is lower the shoes should be heavier and may be made of metal. The substantially closed chamber, in which the shoes operate, is ordinarily packed with grease to maintain a proper film between the shoes and stationary surface.

The springs 50 are of sufficient force to maintain the rotary governor collapsed as shown in Fig. 5, and hence idle, until the speed exceeds that for which the machine is designed; then the centrifugal force overcomes the tension of the springs and the shoes move outwardly into the position shown in Fig. 3, and frictionally contact with the stationary flange 30, thus transforming the excess of energy of the armature into heat, which is readily dissipated by the radiator outside of the flange 30.

I provide means to maintain the radiator cool. This will vary with different constructions, but preferably consists of means for forcing fluid through the passageways of the radiator. I have shown for this purpose a rotary fan forcing air through the radiator. When such fan is employed it is preferably arranged to draw the air through the motor itself and thus maintain it cool.

A fan having the operation above referred to is shown in Figs. 1 and 4. As shown, it comprises a hub 60 keyed to the armature shaft, a disk 61 rigid on the hub, radial vanes 62 carried by the disk, and a bracing ring 63 parallel with the disk and secured to the opposite edges of the vanes. This fan, it will be seen, receives the air centrally from the interior of the machine and forces it outwardly by centrifugal force into the casing 12, so that it passes outwardly at the end of the machine through the vents between the webs 32. Suitable openings 19 are made in the opposite end 11 for the entrance of the cooling air. The passage of this air is approximately indicated by the arrows in Fig. 1.

By housing both the fan and the centrifugal governor within the end member 12, I make a very compact and at the same time simple machine. The fan performs the double duty of maintaining the motor itself cool and of cooling the radiator of the centrifugal governor. The governor itself is very simple in construction, is easily constructed and assembled, is very effective in operation and durable in service.

Having thus described my invention what I claim is:—

1. The combination of a motor frame comprising a field member and an end cap therefor, an armature within the field member, a flange carried by the end cap on its interior, and a centrifugal brake shoe carried by the armature shaft within said flange and adapted to engage the same.

2. The combination of a field frame, an end cap secured thereto, an armature having its shaft journaled in the end cap, a cylindrical flange formed on the interior of the end cap, a disk secured to the inner edge of said flange to provide a chamber about the armature shaft within the end cap, and a movable brake shoe carried by the armature shaft within said chamber adapted to coact with said flange.

3. The combination with a motor frame and armature, of a rotary centrifugal brake comprising a set of arcuate brake shoes forming an annulus, springs mounted in recesses in adjacent brake shoes and connected with them, and means movable with the armature for carrying and guiding the brake shoes.

4. The combination of a motor frame, a friction surface carried by the frame, an armature, a hub mounted on the armature shaft, radial studs on said hub, brake shoes slidably mounted on the studs and adapted to engage said friction surface, and springs mounted in recesses in adjacent brake shoes and tending to retract the brake shoes.

5. The combination, with the motor frame and an armature, of radial guides carried with said armature, brake shoes guided by said guides, tangentially extending openings through adjacent brake shoes, and coiled tension springs occupying said openings and anchored to adjacent shoes and a friction surface which said shoes may engage.

6. The combination, with the motor frame and an armature shaft, of a friction surface carried by the frame, and a rotary centrifugal brake carried by the armature within said surface and adapted to coact therewith, said brake comprising a hub on the armature shaft, radial studs carried by the hub, an arcuate brake shoe slidable on each stud, and springs occupying registering openings in adjacent brake shoes, and anchored at their ends to the respective shoes.

7. The combination, with the motor frame and an armature shaft, radial studs carried by said shaft, slidable brake shoes on each stud having two cylindrical rubbing surfaces there being registering openings through adjacent brake shoes, coiled tension springs occupying said openings and anchored at their ends to the respective shoes, and a cylindrical member which said shoes may engage.

8. The combination, with the motor frame and an armature, of radially slidable brake shoes rotating with the armature and each having two cylindrical rubbing surfaces and an intermediate notch, there being registering openings through adjacent brake shoes, coiled tension springs occupying said openings, rods lying in the corners of the notches onto which the ends of the springs are hooked, and a cylindrical flange carried by the motor frame and surrounding the shoes.

9. The combination of a motor frame, friction surface carried by the frame, an armature, a rotary centrifugal brake carried with the armature and adapted to coact with said surface, said brake having a set of arcuate shoes arranged as an annulus, there being registering openings through adjacent brake shoes, coiled tension springs occupying said openings and rods to which the ends of the springs are secured, said rods being intermediately bowed into the openings to form an anchorage for the spring and to prevent the rod shifting.

10. The combination of a stationary frame having an end cap, an armature having its shaft journaled in the end cap, a centrifugal brake carried by said shaft, a stationary cylindrical flange carried by the end cap surrounding the brake, and outwardly extending webs on the end cap leading from the outside of the flange and having ventilating spaces between them.

11. The combination of a motor, a centrifugal governing brake housed within the motor frame, a radiator for the brake, and means for passing fluid through the radiator.

12. The combination of a motor frame, a stationary braking flange carried thereby, webs and intervening openings on the outer side of the flange, a centrifugal brake shoe carried by the armature shaft and adapted to engage the inner surface of said flange, and means for passing fluid through said intervening openings.

13. The combination with a motor, of a centrifugal governing brake therefor, and a fan adapted to draw air through the armature and force it out adjacent to the brake.

14. In combination, a motor frame, field and armature members therein, a centrifugal brake shoe carried by one of said members, an end cap for the frame, and a flange carried by the cap spaced from its periphery and adapted to be engaged by said brake shoe.

15. The combination of a motor, a centrifugal governing brake, housed within the motor frame, a radiator for the brake, a fan adapted to cause air to travel through the motor and be discharged through the radiator.

16. The combination of a motor frame, a stationary braking flange carried thereby, webs and intervening openings on the outer side of the flange, a centrifugal brake shoe carried by the armature shaft in the interior of the motor frame and adapted to engage the inner surface of said flange, and an adjacent fan carried by the armature shaft.

17. The combination of a motor frame, an end cap therefor, a cylindrical flange on the interior of said cap, webs on the exterior of the flange having openings between them, a plate secured to the inner edge of the flange to provide a brake chamber, a centrifugal brake carried by the armature shaft within said chamber and adapted to engage the flange, and a fan carried by the armature shaft between said plate and armature.

18. The combination of a motor frame, a cylindrical flange on the interior of said frame, a plate secured to the inner edge of the flange, a centrifugal brake carried by the armature shaft within said flange and a fan carried by the armature shaft between said plate and armature, said fan having a hub on the shaft, a disk adjacent to the plate mentioned and vanes carried by said disk.

In testimony whereof, I hereunto affix my signature.

JOEL R. COOK.